United States Patent
Morishita et al.

(10) Patent No.: US 11,702,769 B2
(45) Date of Patent: Jul. 18, 2023

(54) STABILIZED FIBER, METHOD OF PRODUCING THE SAME, AND METHOD OF PRODUCING CARBON FIBER

(71) Applicants: TOYOTA JIDOSHA KABUSHIKI KAISHA, Toyota (JP); KABUSHIKI KAISHA TOYOTA CHUO KENKYUSHO, Nagakute (JP)

(72) Inventors: Takuya Morishita, Nagakute (JP); Mamiko Narita, Nagakute (JP); Makoto Mouri, Nagakute (JP); Yoshihiro Kikuzawa, Nagakute (JP); Hideyasu Kawai, Toyota (JP); Nozomu Shigemitsu, Nissin (JP)

(73) Assignees: TOYOTA JIDOSHA KABUSHIKI KAISHA, Toyota (JP); KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 432 days.

(21) Appl. No.: 17/019,526

(22) Filed: Sep. 14, 2020

(65) Prior Publication Data

US 2021/0087717 A1     Mar. 25, 2021

(30) Foreign Application Priority Data

Sep. 19, 2019   (JP) .................................. 2019-170488

(51) Int. Cl.
*D01F 9/22*   (2006.01)
*C04B 14/38*  (2006.01)

(52) U.S. Cl.
CPC ............ *D01F 9/225* (2013.01); *C04B 14/386* (2013.01); *D10B 2101/12* (2013.01)

(58) Field of Classification Search
CPC ... D01F 9/225; D01F 6/26; D01F 9/21; C04B 14/386; D10B 2101/12; D01D 10/02
See application file for complete search history.

(56) References Cited

U.S. PATENT DOCUMENTS

| | | | |
|---|---|---|---|
| 5,078,926 A | 1/1992 | McHenry et al. | |
| 2010/0112322 A1* | 5/2010 | Kumar | B29C 48/08 |
| | | | 977/840 |
| 2011/0038788 A1 | 2/2011 | Tanaka et al. | |
| 2014/0212663 A1 | 7/2014 | Shinmen et al. | |
| 2018/0148563 A1 | 5/2018 | Hayashida et al. | |

FOREIGN PATENT DOCUMENTS

| | | |
|---|---|---|
| CN | 103703037 A | 4/2014 |
| EP | 2735575 A1 | 5/2014 |
| JP | 37-004405 B | 9/1930 |
| JP | 56006366 B | 2/1981 |
| JP | 60209019 A | 10/1985 |
| JP | S6215329 A | 1/1987 |
| JP | H09231984 A | 9/1997 |
| JP | 2005273036 A | 10/2005 |
| JP | 2007177368 A | 7/2007 |
| JP | 2009138313 A | 6/2009 |
| JP | 2010047865 A | 3/2010 |
| JP | 2013103992 A | 5/2013 |
| JP | 2015074844 A | 4/2015 |
| JP | 2016040419 A | 3/2016 |
| JP | 2016113726 A | 6/2016 |
| JP | 2018090791 A | 6/2018 |
| JP | 2018178344 A | 11/2018 |
| JP | 2019026827 A | 2/2019 |
| WO | 2009125832 A1 | 10/2009 |

* cited by examiner

*Primary Examiner* — Daniel C. McCracken
(74) *Attorney, Agent, or Firm* — Dickinson Wright, PLLC

(57) ABSTRACT

A method of producing a stabilized fiber, including performing a heat treatment on an acrylamide polymer fiber under an oxidizing atmosphere in a stabilization treatment temperature range of 200° C. to 500° C. while applying a tension of 0.07 mN/tex to 15 mN/tex.

8 Claims, No Drawings

STABILIZED FIBER, METHOD OF PRODUCING THE SAME, AND METHOD OF PRODUCING CARBON FIBER

CROSS-REFERENCE TO RELATED APPLICATION

This application claims priority to Japanese Patent Application No. 2019-170488 filed on Sep. 19, 2019, incorporated herein by reference in its entirety.

BACKGROUND

1. Technical Field

The present disclosure relates to a stabilized fiber, a method of producing the same, and a method of producing a carbon fiber.

2. Description of Related Art

Regarding a method of producing a carbon fiber, in the related art, methods in which a carbon fiber precursor obtained by spinning polyacrylonitrile is subjected to a stabilization treatment, and then subjected to carbonization have been mainly used (for example, Japanese Examined Patent Publication No 37-4405 (JP 37-4405 B), Japanese Unexamined Patent Application Publication No. 2015-74844 (JP 2015-74844 A), Japanese Unexamined Patent Application Publication No. 2016-40419 (JP 2016-40419 A), Japanese Unexamined Patent Application Publication No. 2016-113726 (JP 2016-113726 A)). Since the polyacrylonitrile used in this method is unlikely to dissolve in an in inexpensive general-purpose solvent, there are problems that it is necessary to use an expensive solvent such as dimethyl sulfoxide and N,N-dimethylacetamide during polymerization or spinning, which results in an increase in carbon fiber production cost.

In addition, in Japanese Unexamined Patent Application Publication No. 2013-103992 (JP 2013-103992 A), a carbon fiber precursor fiber composed of a polyacrylonitrile copolymer including 96 parts by mass to 97.5 parts by mass of an acrylonitrile unit, 2.5 parts by mass to 4 parts by mass of an acrylamide unit, and 0.01 parts by mass to 0.5 parts by mass of a carboxylic acid-containing vinyl monomer is described. This polyacrylonitrile copolymer contains an acrylamide unit and a carboxylic acid-containing vinyl monomer unit which contribute to water solubility of a polymer, but it has problems that, since their content is low, they are insoluble in water, and during polymerization and molding (spinning), it is necessary to use an expensive solvent such as N,N-dimethylacetamide, which results in an increase in carbon fiber production cost.

In addition, when a heat treatment is applied to polyacrylonitrile or its copolymers, since rapid heat generation occurs, and thermal decomposition of polyacrylonitrile or its copolymers is accelerated, there is a problem of the yield of a carbon material (carbon fiber) being low. Therefore, when a carbon material (carbon fiber) is produced using polyacrylonitrile or its copolymers, it is necessary to gradually increase the temperature over a long time so that no rapid heat generation occurs during a temperature increasing procedure in the stabilization treatment.

On the other hand, acrylamide polymers containing a large number of acrylamide units are water-soluble polymers, and water that is inexpensive and has a low environmental impact can be used as a solvent during polymerization or molding (film formation, sheet formation, spinning, and the like), and thus a reduction in carbon material production cost can be expected. For example, in Japanese Unexamined Patent Application Publication No. 2018-90791 (JP 2018-90791 A), a carbon material precursor composition containing an acrylamide polymer and at least one additive component selected from the group consisting of acids and salts thereof and a method of producing a carbon material using the same are described. In addition, in Japanese Unexamined Patent Application Publication No. 2019-26827 (JP 2019-26827 A), a carbon material precursor composed of an acrylamide/vinyl cyanide copolymer including 50 to 99.9 mol % of an acrylamide monomer unit and 0.1 to 50 mol % of a vinyl cyanide monomer unit, a carbon material precursor composition containing the carbon material precursor and at least one additive component selected from the group consisting of acids and salts thereof, and a method of producing a carbon material using the same are described. However, a carbonization yield in these carbon material production methods is not always sufficient, and there is still room for improvement.

In addition, in Japanese Unexamined Patent Application Publication No. 2009-138313 (JP 2009-138313 A), a method of producing a carbon fiber bundle in which, using a flame-resistant furnace having n zones whose temperatures can be independently controlled, acrylonitrile precursor fiber bundles are subjected to a stabilization treatment so that fiber bundles put into the flame-resistant furnace and the density of the fiber bundle that has passed through the zones satisfy predetermined conditions, and the fiber bundles subjected to the stabilization treatment being carbonized under an inert atmosphere is described, and in this method, it is also described that the density of the precursor fiber bundle introduced into the first zone is controlled to be 1.15 $g/cm^3$ to 1.19 $g/cm^3$, and the density of the fiber bundle that has passed through the nth zone, that is, the density of the fiber bundle subjected to the stabilization treatment is controlled to be 1.33 $g/cm^3$ to 1.37 $g/cm^3$.

In addition, in Japanese Unexamined Patent Application Publication No. 2018-178344 (JP 2018-178344 A), a method of producing a carbon fiber bundle in which polyacrylonitrile precursor fiber bundles are subjected to a heat treatment under an oxidizing atmosphere until the density becomes 1.22 $g/cm^3$ to 1.24 $g/cm^3$, and a heat treatment is then performed until the density becomes 1.32 $g/cm^3$ to 1.35 $g/cm^3$, and additionally, a heat treatment under an oxidizing atmosphere at 275° C. to 295° C. is performed while a tension of 1.6 mN/dtex to 4.0 mN/dtex is applied until the density becomes 1.46 $g/cm^3$ to 1.50 $g/cm^3$ and thereby stabilized fiber bundles are obtained, and a heat treatment from 1,200° C. to 3,000° C. is then performed on the stabilized fiber bundles under an inert atmosphere is described.

SUMMARY

However, since the density of the acrylamide polymer fiber in an absolutely dried state is generally 1.22 $g/cm^3$ to 1.31 $g/cm^3$, and is different from the density (1.15 $g/cm^3$ to 1.19 $g/cm^3$) of a polyacrylonitrile polymer fiber in an absolutely dried state having a different chemical composition, it is not possible to apply conditions described in JP 2009-138313 A to JP 2018-178344 A. That is, the method described in JP 2009-138313 A has a problem of productivity being low because it is necessary to perform a stabilization treatment for a long time (for example, for 70 minutes) at a temperature lower than 300° C. in order to prevent thermal decomposition due to rapid heat generation of the polyacrylonitrile precursor fiber bundle at about 300° C., and additionally has a problem that, when a stabilization treatment is performed on acrylamide polymer fiber bundles under the above conditions, the density and G/D value of the obtained stabilized fiber bundle are low and a carbonization yield is lowered. In addition, there is a problem that, when a stabilization treatment is performed on acrylamide polymer fiber bundles under conditions described in JP 2018-178344 A, fluffing occurs in the stabilized fiber bundles due to high tension during the stabilization treatment, and some of single fibers constituting the fiber bundles easily break.

The present disclosure provides a stabilized fiber which is derived from an acrylamide polymer and has a high carbonization yield, a method of producing the same, and a method of producing a carbon fiber through which it is possible to produce a carbon fiber with a high yield.

The inventors found that, when a heat treatment (stabilization treatment) is performed under an oxidizing atmosphere at a predetermined stabilization treatment temperature while a predetermined tension is applied to an acrylamide polymer fiber, a carbonization yield of the stabilized fiber is improved, and additionally, when carbonization is performed on such a stabilized fiber, it is possible to obtain a carbon fiber with a high yield, and completed the present disclosure.

That is, the method of producing a stabilized fiber of the present disclosure is a method in which an acrylamide polymer fiber is subjected to a heat treatment under an oxidizing atmosphere in a stabilization treatment temperature range of 200° C. to 500° C. while applying a tension of 0.07 mN/tex to 15 mN/tex.

In the method of producing a stabilized fiber of the present disclosure, the heat treatment may be performed until an intensity ratio of a G peak near 1,590 $cm^{-1}$ to a D peak near 1,360 $cm^{-1}$ in a Raman spectrum on a side of the acrylamide polymer fiber becomes 0.5 or more or until the density of the acrylamide polymer fiber becomes 1.35 $g/cm^3$ to 1.75 $g/cm^3$, or the heat treatment may be performed until an intensity ratio of a G peak near 1,590 $cm^{-1}$ to a D peak near 1,360 $cm^{-1}$ in a Raman spectrum on the side of the acrylamide polymer fiber becomes 0.5 or more or until a density of the acrylamide polymer fiber becomes 1.35 $g/cm^3$ to 1.75 $g/cm^3$.

The stabilized fiber of the present disclosure may be derived from an acrylamide polymer and have an intensity ratio of 0.5 or more of a G peak near 1,590 $cm^{-1}$ to a D peak near 1,360 $cm^{-1}$ in a Raman spectrum on the side of the fiber, or have a density of 1.35 $g/cm^3$ to 1.75 $g/cm^3$.

In addition, in the stabilized fiber of the present disclosure, the intensity ratio of a G peak near 1,590 $cm^{-1}$ to a D peak near 1,360 $cm^{-1}$ in a Raman spectrum on the side of the fiber may be 0.5 or more and the density may be 1.35 $g/cm^3$ to 1.75 $g/cm^3$.

The method of producing the carbon fiber of the present disclosure is a method of performing carbonization on the stabilized fiber of the present disclosure, and is, for example, a method including producing a stabilized fiber using the method of producing a stabilized fiber of the present disclosure and performing carbonization on the stabilized fiber.

Here, the reason why the stabilized fiber having a high carbonization yield can be obtained by the method of producing a stabilized fiber of the present disclosure is not completely clear, but the inventors speculate it to be as follows. That is, it is speculated that, when a stabilization treatment is performed while applying a predetermined tension to the acrylamide polymer fiber, since polymer molecules are oriented and arranged in a fiber axis direction, a cyclization reaction, an oxidation reaction, and a dehydration reaction efficiently proceed in molecules to form a structure in which 6-membered carbon rings are continuous, and a stabilized fiber which has an intensity ratio (G/D) of a specific value or more for a G peak to a D peak in a Raman spectrum on the side of the fiber, has a density in a specific range, and is derived from an acrylamide polymer is obtained. Thus, it is speculated that a stabilized fiber having such a Raman peak intensity ratio (G/D) and/or density has a certain proportion or more of a planar structure composed of carbon atoms on the side of the fiber and has a high density, and thus it has excellent heat resistance. In addition, it is speculated that, in such a stabilized fiber having excellent heat resistance, since thermal decomposition during carbonization is restrained, a carbonization reaction proceeds efficiently and a high carbonization yield is exhibited.

On the other hand, when a stabilization treatment is performed on the acrylamide polymer fiber without applying a tension or when a stabilization treatment is performed on an acrylamide polymer powder or film, since orientation and arrangement of polymer molecules do not occur, a cyclization reaction, an oxidation reaction, and a dehydration reaction do not easily proceed in molecules and a structure in which 6-membered carbon it is rings are continuous is unlikely to be formed. As a result, it is speculated that, in the obtained stabilized fiber, since the intensity ratio (G/D) of a G peak to a D peak in a Raman spectrum on the side of the fiber and the density become small and the heat resistance decreases, thermal decomposition occurs during carbonization and the carbonization yield decreases.

According to the present disclosure, it is possible to obtain a stabilized fiber which is derived from an acrylamide polymer and has a high carbonization yield. In addition, it is possible to produce a carbon fiber with a high yield by performing carbonization on such a stabilized fiber.

DETAILED DESCRIPTION OF EMBODIMENTS

Hereinafter, embodiments of the present disclosure will be described in detail.
[Method of Producing a Stabilized Fiber]

First, a method of producing a stabilized fiber of the present disclosure will be described. The method of producing a stabilized fiber of the present disclosure is a method in which an acrylamide polymer fiber is subjected to a heat treatment under an oxidizing atmosphere in a stabilization treatment temperature range of 200° C. to 500° C. while applying a tension of 0.07 mN/tex to 15 mN/tex.
(Acrylamide Polymer)

An acrylamide polymer used in the present disclosure may be a homopolymer of an acrylamide monomer or a copolymer of an acrylamide monomer and other polymerizable monomers, and in order to improve a stabilization yield of an acrylamide polymer fiber, a carbonization yield of a stabilized fiber, and a total yield of stabilization and carbonization, a copolymer of an acrylamide monomer and other polymerizable monomers is preferable.

In addition, the acrylamide polymer used in the present disclosure is preferably soluble in at least one of an aqueous solvent (water, alcohol, and the like and a mixed solvent thereof) and an aqueous mixed solvent (a mixed solvent containing the aqueous solvent and an organic solvent (tetrahydrofuran and the like)). Thereby, during spinning of the acrylamide polymer, dry spinning, dry wet spinning, wet spinning or electro spinning using the aqueous solvent or the aqueous mixed solvent is possible, and it is possible to produce a stabilized fiber and a carbon fiber safely at low cost. In addition, when an additive component to be described below is added to the acrylamide polymer, wet mixing using the aqueous solvent or the aqueous mixed solvent is possible, and the acrylamide polymer and the additive component to be described below can be mixed uniformly and safely at low cost. Here, the content of the organic solvent in the aqueous mixed solvent is not particularly limited as long as it is an amount at which an acrylamide polymer that is insoluble or hardly soluble in the aqueous solvent is dissolved by mixing the organic solvent. In addition, among such acrylamide polymers, an acrylamide polymer soluble in the aqueous solvent is preferable, and an acrylamide polymer soluble in water (water-soluble) is more preferable because in this case a stabilized fiber and a carbon fiber can be produced safely at lower cost.

In addition, the upper limit of the weight-average-molecular weight of the acrylamide polymer used in the present disclosure is not particularly limited, and is generally 5,000,000 or less, and in consideration of spinnability of the acrylamide polymer, is preferably 2,000,000 or less, more preferably 1,000,000 or less, still more preferably 400,000 or less, and particularly preferably 300,000 or less. In addition, the lower limit of the weight-average-molecular weight of the acrylamide polymer is not particularly limited, and is generally 10,000 or more, and in consideration of the strength of the acrylamide polymer fiber, is preferably 20,000 or more, more preferably 30,000 or more, and particularly preferably 40,000 or more. Here, the weight-average-molecular weight of the acrylamide polymer is measured using gel permeation chromatography.

The lower limit of the content of the acrylamide monomer unit in the copolymer of an acrylamide monomer and other polymerizable monomers is preferably 50 mol % or more, more preferably 60 mol % or more, and particularly preferably 70 mol % or more in consideration of the solubility of the copolymer in the aqueous solvent or the aqueous mixed solvent. In addition, the upper limit of the content of the acrylamide monomer unit is preferably 99.9 mol % or less, more preferably 99 mol % or less, still more preferably 95 mol % or less, particularly preferably 90 mol % or less, and most preferably 85 mol % or less in order to improve a stabilization yield of the acrylamide polymer fiber, a carbonization yield of the stabilized fiber, and a total yield of stabilization and carbonization.

The lower limit of the content of other polymerizable monomer units in the copolymer of acrylamide monomers and other polymerizable monomers is preferably 0.1 mol % or more, more preferably 1 mol % or more, still more preferably 5 mol % or more, particularly preferably 10 mol % or more, and most preferably 15 mol % or more in order to improve a stabilization yield of the acrylamide polymer fiber, a carbonization yield of the stabilized fiber, and a total yield of stabilization and carbonization. In addition, the upper limit of the content of other polymerizable monomer units is preferably 50 mol % or less, more preferably 40 mol % or less, and particularly preferably 30 mol % or less in consideration of the solubility of the copolymer in the aqueous solvent or the aqueous mixed solvent.

Examples of acrylamide monomers include acrylamide; N-alkyl acrylamides such as N-methyl acrylamide, N-ethyl acrylamide, N-n-propyl acrylamide, N-isopropyl acrylamide, N-n-butyl acrylamide, and N-tert-butyl acrylamide; N-cycloalkyl acrylamides such as N-cyclohexyl acrylamide; dialkyl acrylamides such as N,N-dimethyl acrylamide; dialkylaminoalkyl acrylamides such as dimethylaminoethyl acrylamide, and dimethylaminopropyl acrylamide; hydroxyalkyl acrylamides such as N-(hydroxymethyl)acrylamide, and N-(hydroxyethyl)acrylamide; N-aryl acrylamides such as N-phenyl acrylamide; diacetone acrylamide; N,N'-alkylenebisacrylamides such as N,N'-methylenebisacrylamide; methacrylamides; N-alkyl methacrylamides such as N-methyl methacrylamide, N-ethyl methacrylamide, N-n-propyl methacrylamide, N-isopropyl methacrylamide, N-n-butyl methacrylamide, and N-tert-butyl methacrylamide; N-cycloalkylmethacrylamides such as N-cyclohexyl methacrylamide; dialkyl methacrylamides such as N,N-dimethylmethacrylamide; dialkylaminoalkyl methacrylamides such as dimethylaminoethyl methacrylamide, and dimethylaminopropyl methacrylamide; hydroxyalkyl methacrylamides such as N-(hydroxymethyl)methacrylamide, and N-(hydroxyethyl)methacrylamide; N-aryl methacrylamides such as N-phenyl methacrylamide; diacetone methacrylamide; and N,N'-alkylenebismethacrylamides such as N,N'-methylenebismethacrylamide. These acrylamide monomers may be used alone or two or more thereof may be used in combination. In addition, among these acrylamide monomers, acrylamide, N-alkyl acrylamides, dialkyl acrylamides, methacrylamides, N-alkyl methacrylamides, or dialkyl methacrylamides are preferable and acrylamides are particularly preferable in order to improve the solubility in the aqueous solvent or the aqueous mixed solvent.

Examples of other polymerizable monomers include a vinyl cyanide monomer, an unsaturated carboxylic acid and salts thereof, an unsaturated carboxylic acid anhydride, an unsaturated carboxylic acid ester, a vinyl monomer, and an olefin monomer. Examples of vinyl cyanide monomers include acrylonitrile, methacrylonitrile, 2-hydroxyethyl acrylonitrile, chloroacrylonitrile, chloromethacrylonitrile, methoxyacrylonitrile, and methoxymethacrylonitrile. Examples of unsaturated carboxylic acids include acrylic acid, methacrylic acid, and itaconic acid, examples of salts of the unsaturated carboxylic acid include metal salts (for example, a sodium salt, a potassium salt, and the like), an ammonium salt, and an amine salt of the unsaturated carboxylic acid, examples of unsaturated carboxylic acid anhydrides include maleic anhydride and itaconic anhydride, examples of unsaturated carboxylic acid esters include methyl acrylate, methyl methacrylate, 2-hydroxyethyl acrylate, and 2-hydroxyethyl methacrylate, examples of vinyl monomers include an aromatic vinyl monomer such as styrene and α-methylstyrene, vinyl chloride, and vinyl alcohol, and examples of olefin monomers include ethylene and propylene. These other polymerizable monomers may be used alone or two or more thereof may be used in combination. In addition, among these other polymerizable monomers, in order to improve the spinnability of the acrylamide polymer, a carbonization yield of the stabilized fiber, and a total yield of stabilization and carbonization, the vinyl cyanide monomer is preferable, and acrylonitrile is particularly preferably, and in consideration of the solubility of the copolymer in the aqueous solvent or the aqueous mixed solvent, an unsaturated carboxylic acid and salts thereof are preferable.

Regarding a method of synthesizing such an acrylamide polymer, a method in which a known polymerization reaction such as radical polymerization, cationic polymerization, anionic polymerization, or living radical polymerization is caused by a polymerization method such as solution polymerization, suspension polymerization, precipitation polymerization, dispersion polymerization, or emulsion polymerization (for example, inverse emulsion polymerization) can be used. Among the polymerization reactions, radical polymerization is preferable because in this case an acrylamide polymer can be synthesized at low cost. In addition, when solution polymerization is used, regarding the solvent, a solvent in which monomers of a raw material and the obtained acrylamide polymer dissolve is preferably used, and an aqueous solvent (water, alcohol, and the like, and a mixed solvent thereof and the like) or an aqueous mixed solvent (a mixed solvent containing an aqueous solvent and an organic solvent (tetrahydrofuran and the like)) is more preferably used because they can be safely synthesized at low cost, and an aqueous solvent is particularly preferably used, and water is most preferably used.

In the radical polymerization, radical polymerization initiators known in the related art such as azobisisobutyronitrile, benzoyl peroxide, 4,4'-azobis(4-cyanovaleric acid), ammonium persulfate, and potassium persulfate can be used as the polymerization initiator. When an aqueous solvent or an aqueous mixed solvent is used as a solvent, a radical polymerization initiator soluble in the aqueous solvent such as 4,4'-azobis(4-cyanovaleric acid), ammonium persulfate, and potassium persulfate or the aqueous mixed solvent (preferably an aqueous solvent, and more preferably water) is preferable. In addition, in order to reduce the molecular weight of the acrylamide polymer and improve spinnability of the acrylamide polymer, in place of or in addition to the polymerization initiator, it is preferable to use a polymerization accelerator known in the related art such as tetramethylethylenediamine and a molecular weight regulating agent such as an alkyl mercaptan, for example, n-dodecyl mercaptan, it is preferable to use the polymerization initiator and the polymerization accelerator in combination and it is particularly preferable to use ammonium persulfate and tetramethylethylenediamine in combination.

The temperature of the polymerization reaction is not particularly limited, and in order to reduce the weight-average-molecular weight Mw of the obtained acrylamide polymer and improve spinnability of the acrylamide polymer, the temperature is preferably 35° C. or higher, more preferably 40° C. or higher, still more preferably 50° C. or higher, particularly preferably 70° C. or higher, and most preferably 75° C. or higher.

(Acrylamide Polymer Fiber)

The acrylamide polymer fiber used in the present disclosure is composed of the acrylamide polymer, and the fineness thereof is not particularly limited, and is preferably $1 \times 10^{-8}$ tex/fiber to 100 tex/fiber, more preferably $1 \times 10^{-6}$ tex/fiber to 60 tex/fiber, still more preferably 0.001 tex/fiber to 40 tex/fiber, yet more preferably 0.01 tex/fiber to 10 tex/fiber, particularly preferably 0.02 tex/fiber to 2 tex/fiber, and most preferably 0.03 tex/fiber to 0.4 tex/fiber. When the fineness of the acrylamide polymer fiber is less than the lower limit, yarn breakage easily occurs, and it tends to be difficult to perform stable winding and the stabilization treatment. On the other hand, when the fineness exceeds the upper limit, a structural difference between near the surface layer and near the center of the stabilized fiber becomes large and the tensile strength and the tensile modulus of the obtained carbon fiber tend to decrease.

In addition, the average fiber diameter of the acrylamide polymer fibers is not particularly limited, and is preferably 3 nm to 300 µm, more preferably 30 nm to 250 µm, still more preferably 1 µm to 200 µm, yet more preferably 3 µm to 100 µm, particularly preferably 4 µm to 40 µm, and most preferably 5 µm to 20 µm. When the average fiber diameter of the acrylamide polymer fibers is less than the lower limit, yarn breakage easily occurs and it tends to be difficult to perform stable winding and the stabilization treatment. On the other hand, when the average fiber diameter exceeds the upper limit, a structural difference between near the surface layer and near the center of the stabilized fiber becomes large and the tensile strength and the tensile modulus of the obtained carbon fiber tend to decrease.

In addition, the density of the acrylamide polymer fiber in an absolutely dried state is not particularly limited, and is preferably 1.22 $g/cm^3$ to 1.31 $g/cm^3$, more preferably 1.23 $g/cm^3$ to 1.30 $g/cm^3$, and particularly preferably 1.24 $g/cm^3$ to 1.29 $g/cm^3$. When the acrylamide polymer fiber having such a density is used, a cyclization reaction in the stabilization treatment tends to be accelerated, and the density of the stabilized fiber after the stabilization treatment tends to be easily controlled such that it is within a predetermined range.

In addition, since the acrylamide polymer fiber exhibits a high stabilization yield, a high carbonization yield and a high total yield of stabilization and carbonization, it can be directly used for producing a stabilized fiber and a carbon fiber without adding an additive component such as an acid. However, in order to further improve a carbonization yield of the stabilized fiber produced from the acrylamide polymer fiber and a total yield of stabilization and carbonization, the acrylamide polymer fiber may contain at least one additive component selected from the group consisting of acids and salts thereof in addition to the acrylamide polymer. When a stabilization treatment is performed on the acrylamide polymer fiber containing the additive component while applying a tension, formation of a ring structure according to a dehydration reaction or a deammonification reaction accelerates and a stabilized fiber having a high carbonization yield is obtained. In addition, in the stabilized fiber of the present disclosure, at least a part of the additive component and the residue may remain. In addition, carbonization may be performed by adding the additive component to the stabilized fiber.

In order to further improve a carbonization yield of the stabilized fiber produced from the acrylamide polymer fiber and a total yield of stabilization and carbonization, the content of such an additive component is preferably 0.1 parts by mass to 100 parts by mass, more preferably 0.2 parts by mass to 50 parts by mass, still more preferably 0.5 parts by mass to 30 parts by mass, and particularly preferably 1 part by mass to 20 parts by mass with respect to 100 parts by mass of the acrylamide polymer.

Examples of acids include inorganic acids such as phosphoric acid, polyphosphoric acid, boric acid, polyboric acid, sulfuric acid, nitric acid, carbonic acid, and hydrochloric acid, and organic acids such as oxalic acid, citric acid, sulfonic acid, and acetic acid. In addition, examples of salts of such acids include metal salts (for example, a sodium salt, a potassium salt, and the like), an ammonium salt, and an amine salt, and an ammonium salt and an amine salt are preferable, and an ammonium salt is more preferable. In particular, among these additive components, in order to further improve a carbonization yield of the stabilized fiber produced from the acrylamide polymer fiber and a total yield of stabilization and carbonization, phosphoric acid, polyphosphoric acid, boric acid, polyboric acid, sulfuric acid, and ammonium salts thereof are preferable, and phosphoric acid, polyphosphoric acid, and ammonium salts thereof are particularly preferable.

The additive component is preferably soluble in at least one of the aqueous solvent and the aqueous mixed solvent (more preferably the aqueous solvent, and particularly preferably water). Thereby, when an acrylamide polymer fiber containing an additive component is produced, wet mixing using the aqueous solvent or the aqueous mixed solvent is possible, and the acrylamide polymer and the additive component can be uniformly and safely mixed at low cost. In addition, dry spinning, dry wet spinning, wet spinning, or electro spinning using the aqueous solvent or the aqueous mixed solvent is possible and it is possible to produce a stabilized fiber and a carbon fiber safely at low cost.

Such an acrylamide polymer fiber can be prepared (produced) as follows. First, an acrylamide polymer composition containing the acrylamide polymer or the acrylamide polymer and the additive component is spun. In this case, melt spinning, spunbond, meltblown, or centrifugal spinning may be performed using the molten acrylamide polymer or the acrylamide polymer composition. However, when the acrylamide polymer or the acrylamide polymer composition is soluble in the aqueous solvent or the aqueous mixed solvent, in order to improve spinnability, preferably, the acrylamide polymer or the acrylamide polymer composition is dissolved in the aqueous solvent or the aqueous mixed solvent, and spinning is performed using the obtained aqueous solution or aqueous mixed solution, or a solution of the above polymerized acrylamide polymer or a solution of an acrylamide polymer composition obtained by wet mixing to be described below is directly used for spinning or is adjusted to have a desired concentration and then used for spinning. Regarding such a spinning method, dry spinning, wet spinning, dry wet spinning, gel spinning, flash spinning, or electro spinning is preferable. Thereby, an acrylamide polymer fiber having a desired fineness and average fiber diameter can be prepared (produced) safely at low cost. In addition, regarding the solvent, the aqueous solvent is more preferably used and water is particularly preferably used so that an acrylamide polymer fiber can be produced safely at lower cost.

In addition, the concentration of the acrylamide polymer in the aqueous solution or the aqueous mixed solution is not particularly limited, and a high concentration of 20 mass % or more is preferable in order to improve the productivity and reduce cost. Here, when the concentration of the acrylamide polymer is too high, since the viscosity of the aqueous solution or the aqueous mixed solution increases and spinnability is reduced, it is preferable to adjust the concentration of the aqueous solution or the aqueous mixed solution to a concentration at which spinning is possible using the viscosity as an index.

Regarding a method of producing the acrylamide polymer composition, a method of directly mixing the additive component with the molten acrylamide polymer (melt mixing), a method of dry-blending the acrylamide polymer and the additive component (dry mixing), a method in which the acrylamide polymer formed into a fiber shape is immersed in or caused to pass through an aqueous solution or aqueous mixed solution containing the additive component or a solution in which the acrylamide polymer does not completely dissolve but the additive component does dissolve and the like can be used. However, when the acrylamide polymer and the additive component used are soluble in the aqueous solvent or the aqueous mixed solvent, a method in which the acrylamide polymer and the additive component are mixed in the aqueous solvent or the aqueous mixed solvent (wet mixing) is preferable because in this case the acrylamide polymer and the additive component can be uniformly mixed. In addition, regarding wet mixing, during synthesis of the acrylamide polymer, when the above polymerization is performed in the aqueous solvent or the aqueous mixed solvent, a method of mixing the additive component after the polymerization or the like can also be used. In addition, the acrylamide polymer composition is collected by removing the solvent from the obtained solution and it can be used for producing a carbon fiber to be described below, and also the obtained solution can be directly used for producing a carbon fiber to be described below without removing the solvent. In addition, in the wet mixing, regarding the solvent, the aqueous solvent is preferably used and water is more preferably used so that the acrylamide polymer composition can be produced safely at lower cost. In addition, a method of removing the solvent is not particularly limited, and at least one method of known methods such as distillation off under a reduced pressure, reprecipitation, hot air drying, vacuum drying, and freeze drying can be used.

Such an acrylamide polymer fiber may be used as a single fiber or may be used as a fiber bundle. When the acrylamide polymer fiber is used as a fiber bundle, the number of filaments per yarn is not particularly limited, and in order to increase the productivity of the stabilized fiber and the carbon fiber and improve mechanical properties, the number is preferably 50 filaments to 96,000 filaments, more preferably 100 filaments to 48,000 filaments, still more preferably 500 filaments to 36,000 filaments, and particularly preferably 1,000 filaments to 24,000 filaments. When the number of filaments per yarn exceeds the upper limit, firing irregularities may occur during the stabilization treatment.

In addition, in order to improve bundling properties and handling properties of fibers, and prevent adhesion between fibers, oils known in the related art such as a silicone oil may be applied to such an acrylamide polymer fiber.

(Method of Producing a Stabilized Fiber)

The method of producing a stabilized fiber of the present disclosure is a method in which the acrylamide polymer fiber is subjected to a heat treatment (stabilization treatment) under an oxidizing atmosphere (for example, in the air) in a stabilization treatment temperature range of 200° C. to 500° C. while applying a tension of 0.07 mN/tex to 15 mN/tex. The acrylamide polymer fiber used in the present disclosure is less likely to be thermally decomposed in the stabilization treatment and the structure of the acrylamide polymer is converted into a structure having a high heat resistance in the stabilization treatment, and thus a high stabilization yield is obtained. In addition, since the obtained stabilized fiber has a structure having a high heat resistance, a high carbonization yield is obtained. In particular, in the acrylamide polymer fiber containing the additive component, due to a catalytic action of an acid or its salt which is an additive component, since a deammonification reaction and a dehydration reaction of the acrylamide polymer is promoted, a ring structure (imide ring structure) or a structure in which two or more rings are continuous is easily formed in a molecule, and since the structure of the acrylamide polymer is easily converted into a structure having a high heat resistance, a stabilization yield of the acrylamide polymer fiber, a carbonization yield of the stabilized fiber, and a total yield of stabilization and carbonization are further improved.

In addition, in the method of producing a stabilized fiber of the present disclosure, in order to improve a carbonization yield of the obtained stabilized fiber and a total yield of stabilization and carbonization, it is preferable to perform the heat treatment (stabilization treatment) until an intensity ratio (G/D) of a peak (G peak) near 1,590 $cm^{-1}$ to a peak (D peak) near 1,360 $cm^{-1}$ in the Raman spectrum on the side of the acrylamide polymer fiber becomes 0.5 or more or until the density of the acrylamide polymer fiber becomes 1.35 $g/cm^3$ to 1.75 $g/cm^3$, and it is more preferable to perform the heat treatment (stabilization treatment) until the G/D becomes 0.5 or more and the density of the acrylamide polymer fiber becomes 1.35 g/cm$^3$ to 1.75 g/cm$^3$. Thereby, it is possible to obtain a stabilized fiber having a higher carbonization yield.

In addition, in the method of producing a stabilized fiber of the present disclosure, the tension applied to the acrylamide polymer fiber is 0.07 mN/tex to 15 mN/tex, preferably 0.10 mN/tex to 12 mN/tex, more preferably 0.15 mN/tex to 10 mN/tex, still more preferably 0.20 mN/tex to 7.5 mN/tex, particularly preferably 0.30 mN/tex to 5.0 mN/tex, and most preferably 0.35 mN/tex to 1.5 mN/tex. When the tension applied to the acrylamide polymer fiber is less than the lower limit, the G/D and the density of the acrylamide polymer fiber are less than a predetermined range and the carbonization yield of the stabilized fiber tends to decrease. On the other hand, when the tension exceeds the upper limit, the acrylamide polymer fiber may break during the stabilization treatment. Here, in the present disclosure, the tension (unit: mN/tex) applied to the acrylamide polymer fiber is a value obtained by dividing the tension (unit: mN) applied to the acrylamide polymer fiber during the stabilization treatment by a fineness (unit: tex) of the acrylamide polymer fiber in an absolutely dried state, that is, a tension per unit fineness of the acrylamide polymer fiber. In addition, such a tension applied to the acrylamide polymer fiber can be adjusted by a load cell, a spring, a weight and the like on the side of an outlet of a heating device such as a flame-resistant furnace.

In addition, in the method of producing a stabilized fiber of the present disclosure, the stabilization treatment is performed in a temperature range of 150° C. to 500° C., preferably in a temperature range of 200° C. to 450° C., and more preferably in a temperature range of 250° C. to 420° C., but the temperature range is not particularly limited. Here, the stabilization treatment performed at such a temperature includes not only a stabilization treatment at a maximum temperature (stabilization treatment temperature) during a stabilization treatment to be described below but also a stabilization treatment in a temperature increasing procedure and the like up to the stabilization treatment temperature.

In addition, the maximum temperature (stabilization treatment temperature) during the stabilization treatment is a temperature range of 200° C. to 500° C., preferably a temperature range of 250° C. to 500° C., more preferably a temperature range of 280° C. to 450° C., still more preferably a temperature range of 290° C. to 420° C., yet more preferably a temperature range of 300° C. to 400° C., particularly preferably a temperature range of 305° C. to 390° C., and most preferably a temperature range of 310° C. to 380° C. When the stabilization treatment temperature is lower than the lower limit, since a deammonification reaction or a dehydration reaction of the acrylamide polymer is not promoted and a ring structure (imide ring structure) is unlikely to be formed in a molecule, the heat resistance of the produced stabilized fiber is low and a stabilization yield of the acrylamide polymer fiber, a carbonization yield of the stabilized fiber, and a total yield of stabilization and carbonization tend to decrease. On the other hand, when the stabilization treatment temperature exceeds the upper limit, the produced stabilized fiber tends to be thermally decomposed.

In addition, in the method of producing a stabilized fiber of the present disclosure, if a predetermined tension is applied to the acrylamide polymer fiber at the stabilization treatment temperature (maximum temperature during the stabilization treatment), a predetermined tension may or may not be applied in the temperature increasing procedure or the like up to the stabilization treatment temperature. However, in order to obtain a sufficient effect according to application of the tension, it is preferable to apply a predetermined tension also in the temperature increasing procedure or the like. In addition, the tension may be applied in an initial stage of the temperature increasing procedure or the like or may be applied in an intermediate stage.

In addition, in the method of producing a stabilized fiber of the present disclosure, after a heat treatment is performed at the stabilization treatment temperature (the maximum temperature during the stabilization treatment) while applying a predetermined tension, the heat treatment may be performed at a temperature higher than the stabilization treatment temperature while applying a tension other than a predetermined tension or without applying the tension.

The stabilization treatment time (a heating time at the maximum temperature) is not particularly limited, and heating for a long time (for example, longer than 2 hours) is also possible, and the time is preferably 1 minute to 120 minutes, more preferably 2 minutes to 60 minutes, still more preferably 3 minutes to 50 minutes, and particularly preferably 4 minutes to 40 minutes. When the heating time in the stabilization treatment is set to the lower limit or more, it is possible to improve the carbonization yield. On the other hand, when the heating time is set to 2 hours or shorter, it is possible to reduce cost.

[Stabilized Fiber]

The stabilized fiber of the present disclosure is a fiber which is derived from an acrylamide polymer and in which an intensity ratio (G/D value) of a peak (G peak) near 1,590 cm$^{-1}$ to a peak (D peak) near 1,360 cm$^{-1}$ in the Raman spectrum on the side of the fiber is 0.5 or more, and the density is 1.35 g/cm$^3$ to 1.75 g/cm$^3$. In addition, in the stabilized fiber of the present disclosure, preferably, the G/D value is 0.5 or more, and the density is 1.35 g/cm$^3$ to 1.75 g/cm$^3$.

When the G/D value is less than the lower limit, since a structure composed of a 6-membered carbon ring is not well formed on the side of the fiber, which indicates that a ring structure is not well formed at the center of the fiber, the carbonization yield of the stabilized fiber and the total yield of stabilization and carbonization decrease. In addition, the G/D value is preferably 0.5 to 2.0, more preferably 0.6 to 1.5, particularly preferably 0.7 to 1.3, and most preferably 0.8 to 1.0. In order to obtain a stabilized fiber having a G/D value of larger than the upper limit, it is necessary to lengthen the stabilization treatment time and increase the amount of energy. In addition, in a stabilized fiber having a G/D value of larger than the upper limit, as the G/D value increases, the stabilization yield decreases, but an effect of increasing the carbonization yield tends to be maximized. Therefore, in consideration of the productivity, the G/D value is preferably the upper limit or less. In addition, in the method of producing a stabilized fiber of the present disclosure, it is preferable to perform the heat treatment (stabilization treatment) on the acrylamide polymer fiber until such a G/D value is obtained.

In addition, when the density of the stabilized fiber is less than the lower limit, since the heat resistance of the stabilized fiber and compactness of the structure are insufficient, the carbonization yield of the stabilized fiber, the total yield of stabilization and carbonization, and the strength of the carbon fiber decrease. On the other hand, in order to obtain a stabilized fiber having a density of larger than the upper limit, it is necessary to lengthen the stabilization treatment time and increase the amount of energy. In addition, in a stabilized fiber having a density of larger than the upper limit, since an effect of increasing the carbonization yield tends to be maximized due to an increase in the density of the stabilized fiber, the density of the stabilized fiber is preferably the upper limit or less in consideration of the productivity. In addition, in order to improve the carbonization yield of the stabilized fiber, the total yield of stabilization and carbonization, and the strength of the carbon fiber and to reduce the amount of energy according to heating during the stabilization treatment, the density of the stabilized fiber is preferably 1.36 g/cm$^3$ to 1.70 g/cm$^3$, more preferably 1.37 g/cm$^3$ to 1.65 g/cm$^3$, still more preferably 1.39 g/cm$^3$ to 1.60 g/cm$^3$, particularly preferably 1.40 g/cm$^3$ to 1.58 g/cm$^3$, and most preferably 1.44 g/cm$^3$ to 1.55 g/cm$^3$. In addition, in the method of producing a stabilized fiber of the present disclosure, it is preferable to perform the heat treatment (stabilization treatment) on the acrylamide polymer fiber until such a density is obtained.

In addition, the average fiber diameter of the stabilized fiber of the present disclosure is not particularly limited, and is preferably 3 nm to 300 µm, more preferably 30 nm to 150 µm, still more preferably 1 µm to 60 µm, still more preferably 3 µm to 20 µm, particularly preferably 4 µm to 15 µm, and most preferably 5 µm to 10 µm. When the average fiber diameter of the stabilized fibers is less than the lower limit, the transportability of the stabilized fiber bundle before carbonization or during carbonization may decrease and some fibers may break. On the other hand, when the average fiber diameter exceeds the upper limit, since a structural difference between near the surface layer and near the center of the fiber during carbonization becomes large, the tensile strength and tensile modulus of the obtained carbon fiber tend to decrease.

In addition, in order to improve the carbonization yield of the stabilized fiber, the average fiber diameter of such stabilized fibers of the present disclosure is preferably 5% or more smaller than, more preferably 10% or more smaller than, still more preferably 15% or more smaller than, particularly preferably 20% or more smaller than, still more preferably 25% or more smaller than, and most preferably 30% or more smaller than the average fiber diameter of the acrylamide polymer fibers before the stabilization treatment.

In addition, in the stabilized fiber of the present disclosure, in an infrared absorption spectrum, an infrared absorption peak is preferably observed in a range of about 1,644 cm$^{-1}$ to 1,653 cm$^{-1}$ and/or a range of about 1,560 cm$^{-1}$ to 1,595 cm$^{-1}$. A stabilized fiber having an infrared absorption peak in a range of about 1,644 cm$^{-1}$ to 1,653 cm$^{-1}$ has excellent transportability before carbonization and during carbonization. In addition, a stabilized fiber having an infrared absorption peak in a range of about 1,560 cm$^{-1}$ to 1,595 cm$^{-1}$ has high strength, and the carbon fiber obtained from the stabilized fiber also has high strength. Here, an infrared absorption peak in a range of about 1,644 cm$^{-1}$ to 1,653 cm$^{-1}$ is an absorption peak derived from an expansion and contraction movement of a carbonyl group of acrylamide, and an infrared absorption peak in a range of about 1,560 cm$^{-1}$ to 1,595 cm$^{-1}$ is an absorption peak derived from a ladder structure composed of two or more 6-membered carbon rings formed due to a cyclization reaction in a molecule during the stabilization treatment.

[Method of Producing a Carbon Fiber]

A method of producing a carbon fiber of the present disclosure is a method of carbonizing the stabilized fiber of the present disclosure, and is, for example, a method including a process of producing a stabilized fiber according to the method of producing a stabilized fiber of the present disclosure and a process of carbonizing the stabilized fiber.

Regarding a method of performing the stabilized fiber carbonization, a heat treatment is performed on the stabilized fiber under an inert atmosphere (in an inert gas such as nitrogen, argon, and helium) at a temperature higher than the temperature in the stabilization treatment (carbonization). Thereby, the stabilized fiber is carbonized to obtain a desired carbon fiber. The heating temperature in such carbonization is preferably 500° C. or higher and more preferably 1,000° C. or higher. Here, generally, "carbonization" according to the present disclosure may include "graphitization" performed by heating at 2,000° C. to 3,000° C. under an inert gas atmosphere. In addition, the upper limit of the heating temperature is preferably 3,000° C. or lower and more preferably 2,500° C. or lower. In addition, the heating time in the carbonization is not particularly limited, and is preferably 30 seconds to 60 minutes, and more preferably 1 minute to 30 minutes. In addition, in the carbonization, a heat treatment can be performed a plurality of times, for example, first, a heat treatment (pre-carbonization) is performed at a temperature of lower than 1,000° C. and a heat treatment (carbonization) is then performed at a temperature of 1,000° C. or higher, and additionally, a heat treatment (graphitization treatment) is performed at a temperature of 2,000° C. or higher.

The average fiber diameter of the carbon fibers obtained in this manner is not particularly limited, and is preferably 3 nm to 300 µm, more preferably 30 nm to 150 µm, still more preferably 1 µm to 60 µm, yet more preferably 3 µm to 20 µm, particularly preferably 4 µm to 15 µm, and most preferably 5 µm to 10 µm. If the average fiber diameter of the carbon fibers is less than the lower limit, when a composite material is produced using a resin or the like as a matrix, a higher viscosity of the matrix causes insufficient impregnation of the resin or the like in the carbon fiber bundle, and the tensile strength of the composite material decreases. On the other hand, if the average fiber diameter exceeds the upper limit, the tensile strength of the carbon fiber tends to decrease.

While the present disclosure will be described below in more detail with reference to examples and comparative example, the present disclosure is not limited to the following examples. Here, acrylamide polymer powders and acrylamide polymer fibers used in the examples and comparative examples were prepared by the following method.

Preparation Example 1

100 parts by mass of a monomer including 75 mol % of acrylamide (AM) and 25 mol % of acrylonitrile (AN) and 4.36 parts by mass of tetramethylethylenediamine were dissolved in 566.7 parts by mass of deionized water, 3.43 parts by mass of ammonium persulfate was added to the obtained aqueous solution while stirring under a nitrogen atmosphere. For polymerization reaction, the mixture was then heated at 70° C. for 150 minutes, and then heated to 90° C. over 30 minutes, and then heated at 90° C. for 1 hour (polymerization rate: 87%). The obtained aqueous solution was added dropwise to methanol to precipitate a copolymer, and the copolymer was collected and vacuum-dried at 80° C. for 12 hours to obtain a water-soluble acrylamide/acrylonitrile copolymer (AM/AN copolymer, AM/AN=80 mol %/20 mol %) powder (p-1).

Preparation Example 2

100 parts by mass of acrylamide (AM) and 8.78 parts by mass of tetramethylethylenediamine were dissolved in 2,912 parts by mass of deionized water, 1.95 parts by mass of ammonium persulfate was added to the obtained aqueous solution while stirring under a nitrogen atmosphere, and a polymerization reaction was then caused at 60° C. for 3 hours. The obtained aqueous solution was added dropwise to methanol to precipitate a homopolymer, and the homopolymer was collected and vacuum-dried at 80° C. for 12 hours to obtain a water-soluble polyacrylamide (PAM, AM=100 mol %) powder (p-2).

Production Example 1

The AM/AN copolymer (AM/AN=80 mol %/20 mol %) powder (p-1) obtained in Preparation Example 1 was dissolved in deionized water and dry spinning was performed using the obtained aqueous solution to produce an acrylamide polymer fiber (f-1).
<Fineness of Acrylamide Polymer Fiber>
The obtained 100 acrylamide polymer fibers (f-1) were bundled to produce an acrylamide polymer fiber bundle, the mass of this fiber bundle was measured, and the fineness of the fiber bundle was calculated by the following formula:

Fineness of fiber bundle [tex]=mass of fiber bundle [g]/fiber length [m]×1,000 [m], when the fineness of single fibers constituting the fiber bundle (fineness of the acrylamide polymer fiber (f-1)) was determined, the result was 0.33 tex/fiber.
<Average Fiber Diameter of Acrylamide Polymer Fiber>
The density of the acrylamide polymer fiber bundle was measured using a dry automatic density meter ("AccuPyc II 1340" commercially available from Micromeritics Instrument Corporation), and the average fiber diameter (average fiber diameter of the acrylamide polymer fibers (f-1)) of single fibers constituting the fiber bundle was determined by the following formula:

$$D=\{(Dt \times 4 \times 1{,}000)/(\rho \times \pi \times n)\}^{1/2}$$

[in the formula, D indicates an average fiber diameter [μm] of single fibers constituting a fiber bundle, Dt indicates the fineness [tex] of the fiber bundle, ρ indicates the density [g/cm³] of the fiber bundle, and n indicates the number of single fibers (pieces) constituting the fiber bundle], and the result was 18 μm.
<Density of Acrylamide Polymer Fiber>
The obtained acrylamide polymer fiber (f-1) was vacuum-dried at 120° C. for 2 hours and water was completely removed until the fiber was absolutely dried, and cooling was performed under vacuum to room temperature, and immediately thereafter, the density of the acrylamide polymer fiber (f-1) was measured using a dry automatic density meter ("AccuPyc II 1340" commercially available from Micromeritics Instrument Corporation, sample cell capacity: 1 cm³) under a helium gas atmosphere at room temperature, and the result was 1.26 g/cm³.

Production Example 2

The AM/AN copolymer (AM/AN=80 mol %/20 mol %) powder (p-1) obtained in Preparation Example 1 was dissolved in deionized water, and 3 parts by mass of phosphoric acid was added to the obtained aqueous solution with respect to 100 parts by mass of the AM/AN copolymer and completely dissolved. Dry spinning was performed using the obtained aqueous solution to produce an acrylamide polymer fiber (f-2). When the fineness, average fiber diameter and density of the acrylamide polymer fiber (f-2) were determined in the same manner as in Production Example 1, the fineness was 0.38 tex/fiber, the average fiber diameter was 19 μm, and the density was 1.26 g/cm³.

Production Example 3

An acrylamide polymer fiber (f-3) was produced in the same manner as in Production Example 2 except that 3 parts by mass of diammonium hydrogen phosphate in place of phosphoric acid was added to 100 parts by mass of the AM/AN copolymer. When the fineness, average fiber diameter and density of the acrylamide polymer fiber (f-3) were determined in the same manner as in Production Example 1, the fineness was 0.46 tex/fiber, the average fiber diameter was 21 μm, and the density was 1.26 g/cm³.

Production Example 4

An acrylamide polymer fiber (f-4) was produced in the same manner as in Production Example 1 except that the PAM (AM=100 mol %) powder (p-2) obtained in Preparation Example 2 in place of the AM/AN copolymer powder (p-1) obtained in Preparation Example 1 was dissolved in deionized water. When the fineness, average fiber diameter and density of the acrylamide polymer fiber (f-4) were determined in the same manner as in Production Example 1, the fineness was 0.40 tex/fiber, the average fiber diameter was 20 μm, and the density was 1.30 g/cm³.

Example 1

The 600 acrylamide polymer fibers (f-1) obtained in Production Example 1 were bundled to produce a precursor fiber bundle, the precursor fiber bundle was put into a heating furnace, heated under an air atmosphere from 50° C. to 150° C. at a rate of 10° C./min, and then heated from 150° C. to 350° C. (stabilization treatment temperature (maximum temperature during the stabilization treatment)) at a rate of 10° C./min while applying a tension of 0.2 mN/tex to the precursor fiber bundle, and subsequently, while applying a tension of 0.2 mN/tex to the precursor fiber bundle, a heat treatment (stabilization treatment) was performed at 350° C. (stabilization treatment temperature (maximum temperature during the stabilization treatment)) for 10 minutes to obtain a stabilized fiber bundle.

The obtained 4 stabilized fiber bundles were bundled to produce a stabilized fiber bundle composed of 2,400 stabilized fibers, this stabilized fiber bundle was transferred into a heating furnace, and subjected to a heat treatment (carbonization) under a nitrogen atmosphere at 1,000° C. for 3 minutes to obtain a carbon fiber bundle.

Example 2

A stabilized fiber bundle was produced in the same manner as in Example 1 except that the 350 acrylamide polymer fibers (f-2) obtained in Production Example 2 in place of the acrylamide polymer fibers (f-1) were bundled to produce a precursor fiber bundle, and a tension of 0.4 mN/tex was applied to the precursor fiber bundle during heating from 150° C. to 350° C. (stabilization treatment temperature (maximum temperature during the stabilization treatment)) and during a heat treatment at 350° C. (stabilization treatment temperature (maximum temperature during the stabilization treatment)). In addition, a carbon fiber bundle was produced in the same manner as in Example 1 except that 8 stabilized fiber bundles were bundled to produce a stabilized fiber bundle composed of 2,800 stabilized fibers.

Example 3

A stabilized fiber bundle and a carbon fiber bundle were produced in the same manner as in Example 1 except that the 600 acrylamide polymer fibers (f-3) obtained in Production Example 3 in place of the acrylamide polymer fibers (f-1) were bundled to produce a precursor fiber bundle, the stabilization treatment temperature (maximum temperature during the stabilization treatment) was changed to 320° C., and the stabilization treatment time (heating time at the maximum temperature) was changed to 30 minutes.

Example 4

A stabilized fiber bundle and a carbon fiber bundle were produced in the same manner as in Example 1 except that the 600 acrylamide polymer fibers (f-4) obtained in Production Example 4 in place of the acrylamide polymer fibers (f-1) were bundled to produce a precursor fiber bundle.

Example 5

A stabilized fiber bundle and a carbon fiber bundle were produced in the same manner as in Example 1 except that the stabilization treatment temperature (maximum temperature during the stabilization treatment) was changed to 300° C., and the stabilization treatment time (heating time at the maximum temperature) was changed to 30 minutes.

Example 6

A stabilized fiber bundle and a carbon fiber bundle were produced in the same manner as in Example 1 except that the 600 acrylamide polymer fibers (f-3) obtained in Production Example 3 in place of the acrylamide polymer fibers (f-1) were bundled to produce a precursor fiber bundle, the stabilization treatment temperature (maximum temperature during the stabilization treatment) was changed to 300° C., and the stabilization treatment time (heating time at the maximum temperature) was changed to 30 minutes.

Example 7

A stabilized fiber bundle and a carbon fiber bundle were produced in the same manner as in Example 1 except that a tension applied to the precursor fiber bundle was changed to 0.1 mN/tex during heating from 150° C. to 350° C. (stabilization treatment temperature (maximum temperature during the stabilization treatment)) and during a heat treatment at 350° C. (stabilization treatment temperature (maximum temperature during the stabilization treatment)).

Comparative Example 1

A stabilized fiber bundle and a carbon fiber bundle were produced in the same manner as in Example 1 except that a tension applied to the precursor fiber bundle was changed to 0.05 mN/tex during heating from 150° C. to 350° C. (stabilization treatment temperature (maximum temperature during the stabilization treatment)) and during a heat treatment at 350° C. (stabilization treatment temperature (maximum temperature during the stabilization treatment)).

Comparative Example 2

A stabilized fiber bundle and a carbon fiber bundle were produced in the same manner as in Example 1 except that no tension was applied to the precursor fiber bundle.

Comparative Example 3

The AM/AN copolymer (AM/AN=80 mol %/20 mol %) powder (p-1) obtained in Preparation Example 1 was put into a heating furnace, heated under an air atmosphere from room temperature to 350° C. (stabilization treatment temperature (maximum temperature during the stabilization treatment)) at a rate of 10° C./min, and then subjected to a heat treatment (stabilization treatment) at 350° C. (stabilization treatment temperature (maximum temperature during the stabilization treatment)) for 30 minutes to obtain a flame-resistant powder.

The obtained flame-resistant powder was put into a heating furnace, heated under a nitrogen atmosphere from room temperature to 1,000° C. at a rate of 20° C./min, and then subjected to a heat treatment (carbonization) at 1,000° C. for 3 minutes to obtain a carbon powder.

Comparative Example 4

A flame-resistant powder and a carbon powder were produced in the same manner as in Comparative Example 3 except that the stabilization treatment temperature (maximum temperature during the stabilization treatment) was changed to 400° C.

Comparative Example 5

The AM/AN copolymer (AM/AN=80 mol %/20 mol %) powder (p-1) obtained in Preparation Example 1 was dissolved in deionized water so that the concentration of the AM/AN copolymer was 20 mass %, and 3 parts by mass of diammonium hydrogen phosphate was added to the obtained aqueous solution with respect to 100 parts by mass of the AM/AN copolymer and completely dissolved. Water was distilled off from the obtained aqueous solution under a reduced pressure and the precipitated solid component was vacuum-dried and then pulverized to obtain a precursor mixed powder containing the AM/AN copolymer and diammonium hydrogen phosphate.

A flame-resistant powder and a carbon powder were produced in the same manner as in Comparative Example 3 except that the precursor mixed powder in place of the AM/AN copolymer powder (p-1) was used and the stabilization treatment time (heating time at the maximum temperature) was changed to 10 minutes.

Comparative Example 6

A flame-resistant powder and a carbon powder were produced in the same manner as in Comparative Example 3 except that the stabilization treatment temperature (maximum temperature during the stabilization treatment) was changed to 300° C. and the stabilization treatment time (heating time at the maximum temperature) was changed to 10 minutes.

Comparative Example 7

A flame-resistant powder and a carbon powder were produced in the same manner as in Comparative Example 3 except that the stabilization treatment temperature (maximum temperature during the stabilization treatment) was changed to 300° C.

Comparative Example 8

A stabilized fiber bundle and a carbon fiber bundle were produced in the same manner as in Example 1 except that the 600 acrylamide polymer fibers (f-4) obtained in Production Example 4 in place of the acrylamide polymer fibers (f-1) were bundled to produce a precursor fiber bundle, and a tension of 0.05 mN/tex was applied to the precursor fiber bundle during heating from 150° C. to 350° C. (stabilization treatment temperature (maximum temperature during the stabilization treatment)) and during a heat treatment at 350° C. (stabilization treatment temperature (maximum temperature during the stabilization treatment)).

Comparative Example 9

A stabilized fiber bundle and a carbon fiber bundle were produced in the same manner as in Example 1 except that the 600 acrylamide polymer fibers (f-4) obtained in Production Example 4 in place of the acrylamide polymer fibers (f-1) were bundled to produce a precursor fiber bundle, the stabilization treatment temperature (maximum temperature during the stabilization treatment) was changed to 300° C., and no tension was applied to the precursor fiber bundle.

Comparative Example 10

A flame-resistant powder and a carbon powder were produced in the same manner as in Comparative Example 3 except that the PAM (AM=100 mol %) powder (p-2) obtained in Preparation Example 2 in place of the AM/AN copolymer powder (p-1) was used, and the stabilization treatment time (heating time at the maximum temperature) was changed to 10 minutes.

<Average Fiber Diameter of Stabilized Fibers>

The obtained stabilized fiber bundle was observed using a microscope ("digital microscope VHX-1000" commercially available from Keyence Corporation), 10 measurement points on fiber diameters of single fibers were randomly extracted, the fiber diameters of the flame-resistant single fibers constituting the stabilized fiber bundle were measured, and an average value thereof (average fiber diameter of stabilized fibers) was obtained. The results are shown in Table 1.

<Raman Spectroscopy of Stabilized Fiber (or Flame-Resistant Powder)>

A Raman spectrum of the side (or the surface of the flame-resistant powder) of the obtained stabilized fiber bundle was measured using a laser Raman spectroscopy analyzer ("NSR-3300" commercially available from JASCO Corporation) at room temperature. In the obtained Raman spectrum, an intensity ratio (G/D) (a ratio of height from a base line to a peak top) of a G peak (peak near 1,590 cm$^{-1}$) derived from the in-plane movement of carbon atoms to a D peak (peak near 1,360 cm$^{-1}$) derived from defects was determined. The results are shown in Table 1.

<Density of Stabilized Fiber (or Flame-Resistant Powder)>

The obtained stabilized fiber bundle (or flame-resistant powder) was vacuum-dried at 120° C. for 2 hours, water was completely removed until the bundle was absolutely dried, and cooling was performed under vacuum to room temperature, and immediately thereafter, the density of the stabilized fiber (or flame-resistant powder) was measured using a dry automatic density meter ("AccuPyc II 1340" commercially available from Micromeritics Instrument Corporation, sample cell capacity: 1 cm$^3$) under a helium gas atmosphere at room temperature. The results are shown in Table 1.

<Average Fiber Diameter of Carbon Fibers>

The obtained carbon fiber bundle was observed using a microscope ("digital microscope VHX-1000" commercially available from Keyence Corporation), 10 measurement points on fiber diameters of single fibers were randomly extracted, the fiber diameters of the carbon fibers constituting the carbon fiber bundle were measured, and an average value thereof (average fiber diameter of carbon fibers) was obtained. The results are shown in Table 1.

<Stabilization Yield>

The stabilization yield was determined by the following formula:

Stabilization yield [%]=mass [mg] of stabilized fiber bundle (or flame-resistant powder)/mass [mg] of precursor fiber bundle (or precursor powder) before stabilization treatment×100

The results are shown in Table 1.

<Carbonization yield>

The carbonization yield was determined by the following formula:

Carbonization yield [%]=mass [mg] of carbon fiber bundle (or carbon powder)/mass [mg] of stabilized fiber bundle (or flame-resistant powder) before carbonization×100

The results are shown in Table 1.

<Total Yield of Stabilization and Carbonization>

The total yield of stabilization and carbonization was determined by the following formula:

Total yield [%]=(stabilization yield/100)×(carbonization yield/100)×100

The results are shown in Table 1.

TABLE 1

| | Precursor | | | | | Stabilization treatment | | | Stabilized fiber/flame resistant powder | | |
|---|---|---|---|---|---|---|---|---|---|---|---|
| | Composition AM/AN | Additive component (amount added*[1]) | Shape | Average fiber diameter [μm] | Number of fibers | Temperature [° C.] | Time [m] | Tension [mN/tex] | Average fiber diameter [μm] | G/D | Density [g/cm$^3$] |
| Example 1 | 80/20 | No | Fiber | 18 | 600 | 350 | 10 | 0.2 | 11 | 0.8 | 1.46 |
| Example 2 | 80/20 | Phosphoric acid (3) | Fiber | 19 | 350 | 350 | 10 | 0.4 | 10 | 0.9 | 1.54 |

TABLE 1-continued

| | | | | | | | | | | |
|---|---|---|---|---|---|---|---|---|---|---|
| Example 3 | 80/20 | Phosphate (3) | Fiber | 21 | 600 | 320 | 30 | 0.2 | 12 | 0.9 | 1.51 |
| Example 4 | 100/0 | No | Fiber | 20 | 600 | 350 | 10 | 0.2 | 12 | 0.8 | 1.49 |
| Example 5 | 80/20 | No | Fiber | 18 | 600 | 300 | 30 | 0.2 | 12 | 0.6 | 1.36 |
| Example 6 | 80/20 | Phosphate (3) | Fiber | 21 | 600 | 300 | 30 | 0.2 | 12 | 0.7 | 1.38 |
| Example 7 | 80/20 | No | Fiber | 18 | 600 | 350 | 10 | 0.1 | 13 | 0.6 | 1.36 |
| Comparative Example 1 | 80/20 | No | Fiber | 18 | 600 | 350 | 10 | 0.05 | 14 | 0.4 | 1.34 |
| Comparative Example 2 | 80/20 | No | Fiber | 18 | 600 | 350 | 10 | 0 | 16 | 0.4 | 1.33 |
| Comparative Example 3 | 80/20 | No | Powder | — | — | 350 | 30 | 0 | — | 0.4 | 1.32 |
| Comparative Example 4 | 80/20 | No | Powder | — | — | 400 | 30 | 0 | — | 0.4 | 1.33 |
| Comparative Example 5 | 80/20 | Phosphate (3) | Powder | — | — | 350 | 10 | 0 | — | 0.4 | 1.33 |
| Comparative Example 6 | 80/20 | No | Powder | — | — | 300 | 10 | 0 | — | 0 | 1.30 |
| Comparative Example 7 | 80/20 | No | Powder | — | — | 300 | 30 | 0 | — | 0 | 1.31 |
| Comparative Example 8 | 100/0 | No | Fiber | 20 | 600 | 350 | 10 | 0.05 | 15 | 0.4 | 1.34 |
| Comparative Example 9 | 100/0 | No | Fiber | 20 | 600 | 300 | 10 | 0 | 17 | 0.3 | 1.34 |
| Comparative Example 10 | 100/0 | No | Powder | — | — | 350 | 10 | 0 | — | 0.4 | 1.33 |

| | Carbon fiber Average fiber diameter [μm] | Stabilization yield [%] | Carbonization yield [%] | Total yield of stabilization and carbonization [%] |
|---|---|---|---|---|
| Example 1 | 8 | 73 | 64 | 47 |
| Example 2 | 7 | 72 | 68 | 49 |
| Example 3 | 9 | 72 | 66 | 48 |
| Example 4 | 9 | 72 | 62 | 45 |
| Example 5 | 9 | 75 | 57 | 43 |
| Example 6 | 9 | 73 | 60 | 44 |
| Example 7 | 10 | 73 | 57 | 42 |
| Comparative Example 1 | 11 | 72 | 56 | 40 |
| Comparative Example 2 | 13 | 72 | 53 | 38 |
| Comparative Example 3 | — | 66 | 50 | 33 |
| Comparative Example 4 | — | 53 | 51 | 27 |
| Comparative Example 5 | — | 68 | 53 | 36 |
| Comparative Example 6 | — | 79 | 31 | 24 |
| Comparative Example 7 | — | 78 | 31 | 24 |
| Comparative Example 8 | 12 | 68 | 50 | 34 |
| Comparative Example 9 | 13 | 75 | 36 | 27 |
| Comparative Example 10 | — | 64 | 49 | 31 |

*1 Amount added (parts by mass) with respect to 100 parts by mass of copolymer

As shown in Table 1, it was found that, when the acrylamide polymer fiber was subjected to the stabilization treatment while applying a predetermined tension (Examples 1 to 7), the peak intensity ratio (G/D) in the Raman spectrum was higher, the density of the stabilized fiber was higher, and the carbonization yield and the total yield of stabilization and carbonization were improved compared to when the stabilization treatment was performed while applying a tension smaller than the predetermined tension (Comparative Examples 1 and 8), when the stabilization treatment was performed without applying a tension (Comparative Examples 2 and 9), and when the acrylamide polymer powder was subjected to the stabilization treatment (Comparative Examples 3 to 7 and 10).

Specifically, it can be clearly understood from comparison between Examples 1 and 7 and Comparative Examples 1 and 2, and Example 4 and Comparative Example 8 that, even if the stabilization treatment was performed at the same temperature and time when a predetermined tension was applied (Examples 1, 7, and 4), the peak intensity ratio (G/D) in the Raman spectrum was higher, the density of the stabilized fiber was higher, and the carbonization yield and the total yield of stabilization and carbonization were improved compared to when the applied tension was small (Comparative Examples 1 and 8) and when no tension was applied (Comparative Example 2). In addition, it can be clearly understood from comparison between Example 1 and Example 7 that, when the applied tension was higher, the peak intensity ratio (G/D) in the Raman spectrum was higher, the density of the stabilized fiber was higher, and the carbonization yield and the total yield of stabilization and carbonization were improved.

In addition, it can be clearly understood from comparison between Example 1 and Example 2 that, even if the stabilization treatment was performed at the same temperature and time, when phosphoric acid was added to the acrylamide polymer to produce an acrylamide polymer fiber and the tension applied to the acrylamide polymer fiber increased, the peak intensity ratio (G/D) in the Raman spectrum was higher, the density of the stabilized fiber was higher, and the carbonization yield and the total yield of stabilization and carbonization were improved.

In addition, it can be clearly understood from comparison between Example 1 and Example 5 that, even if the same tension was applied, when the stabilization treatment temperature (maximum temperature during the stabilization treatment) was higher, the peak intensity ratio (G/D) in the Raman spectrum was higher, the density of the stabilized fiber was higher, and the carbonization yield and the total yield of stabilization and carbonization were improved. In addition, it can be clearly understood from comparison between Example 3 and Example 6 that, even if the acrylamide polymer fiber produced by adding phosphate to the acrylamide polymer was used, when the same tension was applied, if the stabilization treatment temperature (maximum temperature during the stabilization treatment) was higher, the peak intensity ratio (G/D) in the Raman spectrum was higher, the density of the stabilized fiber was higher, and the carbonization yield and the total yield of stabilization and carbonization were improved.

As described above, according to the present disclosure, it is possible to obtain a stabilized fiber which is derived from an acrylamide polymer and has a high carbonization yield. In addition, it is possible to produce a carbon fiber with a high yield by performing carbonization on such a stabilized fiber. In addition, since such carbon fibers have various excellent properties such as lightweight, strength, elasticity, and corrosion resistance, they can be widely used as materials for various applications, for example, aviation materials, space materials, automobile materials, pressure containers, civil engineering and construction materials, robot materials, communication device materials, medical materials, electronic materials, wearable materials, wind turbines, and sports products such as golf shafts fishing rods.

In addition, since the stabilized fiber of the present disclosure has excellent heat resistance and flame retardance, it can be used as fireproof insulation materials, sputter sheets, various filters, and the like in addition to intermediate raw materials of carbon fibers.

What is claimed is:

1. A method of producing a stabilized fiber, comprising performing a heat treatment on an acrylamide polymer fiber under an oxidizing atmosphere in a stabilization treatment temperature range of 200° C. to 500° C. while applying a tension of 0.07 mN/tex to 15 mN/tex, wherein the heat treatment is performed until an intensity ratio of a G peak near 1,590 $cm^{-1}$ to a D peak near 1,360 $cm^{-1}$ in a Raman spectrum on a side of the acrylamide polymer fiber becomes 0.5 or more, wherein an acrylamide polymer used in the acrylamide polymer fiber is a homopolymer of an acrylamide monomer or a copolymer of an acrylamide monomer and other polymerizable monomers in which a content of the acrylamide monomer unit in the copolymer is 50 mol % or more.

2. A method of producing a carbon fiber, comprising:
producing the stabilized fiber using the method according to claim 1; and
performing carbonization on the stabilized fiber.

3. A method of producing a stabilized fiber, comprising, performing a heat treatment on an acrylamide polymer fiber under an oxidizing atmosphere in a stabilization treatment temperature range of 200° C. to 500° C. while applying a tension of 0.07 mN/tex to 15 mN/tex wherein the heat treatment is performed until a density of the acrylamide polymer fiber becomes 1.35 $g/cm^3$ to 1.75 $g/cm^3$, wherein an acrylamide polymer used in the acrylamide polymer fiber is a homopolymer of an acrylamide monomer or a copolymer of an acrylamide monomer and other polymerizable monomers in which a content of the acrylamide monomer unit in the copolymer is 50 mol % or more.

4. A method of producing a carbon fiber, comprising:
producing the stabilized fiber using the method according to claim 3; and
performing carbonization on the stabilized fiber.

5. A stabilized fiber which is derived from an acrylamide polymer and has an intensity ratio of 0.5 or more of a G peak near 1,590 $cm^{-1}$ to a D peak near 1,360 $cm^{-1}$ in a Raman spectrum on the side of the fiber,
wherein the acrylamide polymer is a homopolymer of an acrylamide monomer or a copolymer of an acrylamide monomer and other polymerizable monomers in which a content of the acrylamide monomer unit in the copolymer is 50 mol % or more.

6. A method of producing a carbon fiber, comprising performing carbonization on the stabilized fiber according to claim 5.

7. A stabilized fiber which is derived from an acrylamide polymer and has a density of 1.35 $g/cm^3$ to 1.75 $g/cm^3$,
wherein the acrylamide polymer is a homopolymer of an acrylamide monomer or a copolymer of an acrylamide monomer and other polymerizable monomers in which a content of the acrylamide monomer unit in the copolymer is 50 mol % or more.

8. A method of producing a carbon fiber, comprising performing carbonization on the stabilized fiber according to claim 7.

* * * * *